United States Patent [19]

Yamada et al.

[11] 4,237,505
[45] Dec. 2, 1980

[54] COMBINED RECORDING AND PLAYBACK MAGNETIC TAPE HEAD WITH SHIELD CASES AND A FLAT CHIP FOR CONTROLLING TAPE WRAP ANGLE

[75] Inventors: Yozo Yamada; Michinori Narui, both of Tokorozawa, Japan

[73] Assignee: Pioneer Electronic Corporation, Tokyo, Japan

[21] Appl. No.: 957,503

[22] Filed: Nov. 3, 1978

[30] Foreign Application Priority Data

Nov. 5, 1977 [JP] Japan ............................ 52-147953[U]

[51] Int. Cl.³ .......................... G11B 5/22; G11B 5/28; G11B 15/60
[52] U.S. Cl. .................................... 360/122; 360/121; 360/129; 360/130.2
[58] Field of Search ........................ 360/122, 121–125, 360/129, 130.2, 130.21, 128, 102, 103

[56] References Cited
U.S. PATENT DOCUMENTS

| 3,238,603 | 3/1966 | Curtis et al. ........................ 360/121 |
| 3,252,153 | 5/1966 | Mos ....................................... 360/128 |
| 3,551,609 | 12/1970 | Libby et al. ........................ 360/128 |
| 3,806,902 | 4/1974 | Drees et al. ........................ 360/121 |

OTHER PUBLICATIONS

IBM Tech. Disc. Bull., Chow et al., Bidirectional Magnetic Head, vol. 14, No. 9, Feb. 1972, pp. 2631-2632.

Primary Examiner—Alfred H. Eddleman
Attorney, Agent, or Firm—Sughrue, Rothwell, Mion, Zinn and Macpeak

[57] ABSTRACT

A combined magnetic tape head for use in recording equipment comprises a recording head covered by a shield case, a playback head covered by a shield case and a flat chip for providing a preferable wrap angle of recording tape. The recording and the playback heads are combined into a unitary element by means of a tightening mechanism and/or adhesive agnets. The shield cases are provided at their arcuate front surfaces facing the recording tape with cut portions which are adapted to receive the flat chip, thereby making it possible to readily position the flat chip at a desired position.

7 Claims, 8 Drawing Figures

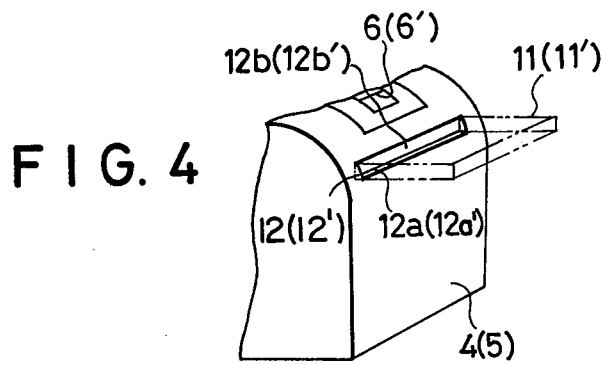
FIG. 4
FIG. 6
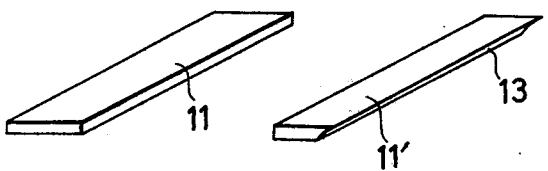
FIG. 7
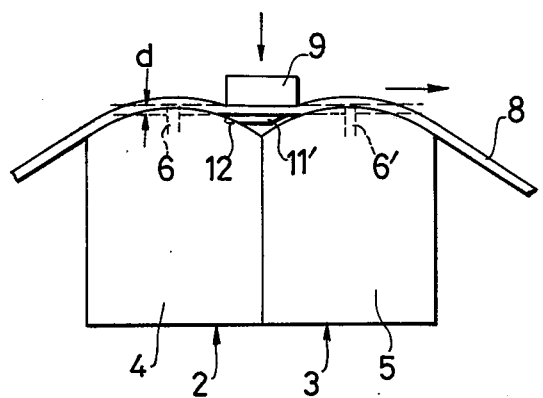

COMBINED RECORDING AND PLAYBACK MAGNETIC TAPE HEAD WITH SHIELD CASES AND A FLAT CHIP FOR CONTROLLING TAPE WRAP ANGLE

BACKGROUND OF THE INVENTION

This invention relates to a combined magnetic tape head for use in recording equipment, and more particularly to a combined magnetic tape head for use in cassette type or cartridge type equipment. This equipment genrally comprises a recording head covered by a shield case, a so-called playback head covered by a shield case and a flat chip for providing a desired contact condition between a magnetic recording tape and the recording and playback heads.

Generally, tape equipment requires at least two separate heads, that is, an erase head which cleans a magnetic recording tape of previous recordings and noise, and a combined recording and playback head. As shown in FIG. 1, the combined recording/playback head comprises a recording head 2 including a ring-shaped core having a gap 6, coils wound around the core (not shown), a shield case 4 and an anti-magnetic frame 14, and a playback head 3 includes a ring-shaped core having a gap 6', coils wound around the core (not shown), a shield case 5 and an anti-magnetic frame 14'. The recording and the playback heads are combined into a unitary element by means of a suitable means such as a tightening band 7 and/or an adhesive agent.

The recording tape travelling operation in conventional cassette or cartridge equipments will now be described with reference to FIG. 2 in the attached drawings. FIG. 2 is a schematic side view illustrating the relationship between a conventional combined recording/playback head and a magnetic recording tape 8. The recording tape 8 travels over a recording head 2 and a playback head 3 under suitable pressure caused by biasing the tape 8 toward the heads 2 and 3 by means of a common flexible pad 9. Force is applied to the tape 8 in the direction of the vertical arrow in FIG. 2. The common flexible pad 9 is normally contained and fixed in a cassette type recording tape or a cartridge type recording tape. More specifically, the tape 8 travels over the respective arcuate front surfaces of heads 2 and 3 in a condition such that the common pad 9 biases the tape 8 toward a V-shaped groove defined by the arcuate front surfaces of heads 2 and 3 which are provided adjacently to each other. It is therefore possible to obtain the desired contact pressure condition between the tape 8 and the surfaces, that is, to obtain a preferable wrap angle as shown in FIG. 2.

It should be noted that, the arcuate front surfaces thereof are represented by circular arcs having the same radiuses R, respectively, and the wrap angle in each head is representative of a central angle corresponding to an arcuate front surface of the head which the tape contacts. In this construction, however, it is difficult to maintain the desired contact of the tape 8 to arcuate front surfaces of heads due to lack of uniformity in the biasing force.

In order to eliminate the above drawbacks, according to experiments performed by the present inventor, it has been established that a flat chip 10 made of non-magnetic material may be provided over the above mentioned V-shaped groove in a bridge like manner as shown in FIG. 3. With such an assembled combined head, a distance "d" is established from a phantom tangent plane including the top end portions in the arcuate front surfaces of the heads, to the top surface of the chip 10. This distance "d", that is, the distance between a tangent extending from the tops of the gaps 6 and 6' to the front surface of flat chip 10, is selected to be within the range of about 0.01 to 0.3 mm when the travelling tape 8 is biased toward the heads by the pad 9. Due to this construction it is possible to obtain a more preferable wrap angle than the conventional combined head shown in FIG. 2. This prior art has been disclosed in a published unexamined Japanese patent application No. 53—111710 which was laid-open for public inspection on Sept. 29, 1978.

With the combined recording/playback head as described above, however, the flat chip 10 has to be attached to the arcuate front head surfaces by an adhesive agent. The flat chip 10 to be attached must be maintained by means of suitable jigs in a fixed condition that satisfies the above mentioned condition until the chip 10 is fixedly positioned by curing of the adhesive agent. This is disadvantageous in that the head manufacturing step requires jigs and therefore the manufacturing efficiency is decreased. Thus, such a prior art combined head is not suitable to mass-production.

Also, the chip 10 may eventually be displaced by constant running of the tape 8, or as a result of rough handling of the recorder, for example by careless or negligent cleaning of the heads.

SUMMARY OF THE INVENTION

Accordingly, it is a primary object of the present invention to eliminate the afore-mentioned drawbacks accompanying conventional combined magnetic tape heads.

It is another object of the present invention to make it easy to position a flat chip at a desired position on arcuate front surfaces of recording and playback heads in a combined tape head, whereby its workability is improved.

It is further object of the present invention to provide a combined recording/playback head which is high in manufacturing efficiency and mass-productivity and can provide a desired tape travelling condition, i.e., a preferable wrap angle.

The foregoing objects of the present invention are accomplished by respectively providing cut portions adapted to receive the flat chip in the shield cases of a recording head and a playback head in a combined tape head assembly, and then adhering the flat chip to the cut portions by means of adhesive agent or the like.

BRIEF DESCRIPTION OF THE DRAWINGS

In the drawings:

FIG. 4 is a partially perspective view illustrating the combined magnetic head according to the present invention;

FIGS. 6(a) and 6(b) are perspective views illustrating first and second examples of a flat chip according to the present invention; and FIG. 7 is a schematic side view illustrating a second preferred embodiment of the combined magnetic head according to the present invention.

DESCRIPTION OF THE PREFERRED EMBODIMENTS

Figure 1:
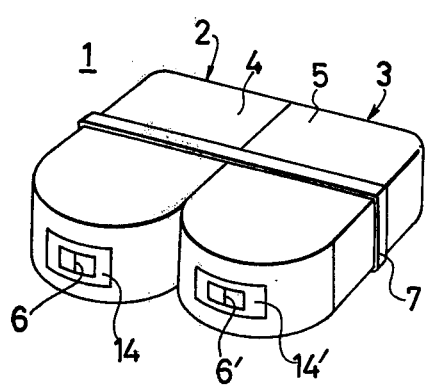
FIG. 1 is a schematic perspective view illustrating a conventional combined magnetic tape head.
Figure 3:
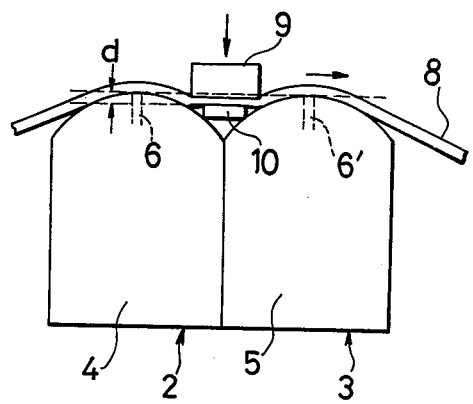
FIG. 3 is a schematic side view illustrating a second prior art combined magnetic head.
Figure 2:
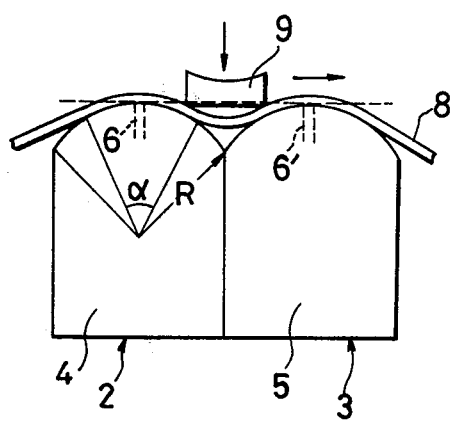
FIG. 2 is a schematic side view illustrating the conventional combined magnetic tape head of FIG. 1.

One preferred embodiment of a combined magnetic tape head will be described with reference to FIGS. 4 and 5.

FIG. 4 is an enlarged perspective view illustrating a cut portion 12 or 12' in a shield case 4 or 5 according to the present invention. The cut portion 12 or 12' is adapted to receive the rectangular corner of a flat chip 11 made of nonmagnetic material for providing a preferable wrap angle of recording tape and is formed on the arcuate front surface of the shield case 4 or 5 of a recording head 2 or a playback head 3. The cut portion has a vertical sides 12b, (12b') and a horizontal side 12a, (12a') to define a notch in the shield case.

Figure 5:
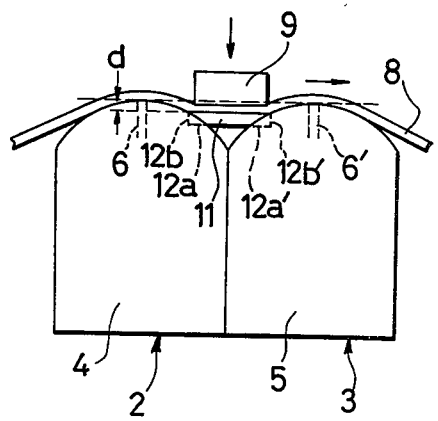
FIG. 5 is a schematic side view illustrating a first preferred embodiment of the combined magnetic head according to the present invention.

As shown in FIG. 5, a schematic side view illustrating the first preferred embodiment of a combined magnetic tape head according to the present invention, the cut portions 12 and 12' are formed on the arcuate front surfaces of the shield cases 4 and 5. The horizontal portions 12a and 12a' are parallel to a phantom tangent plane between the arcuate front surfaces of both gaps 6 and 6', respectively. The vertical portions 12b and 12b' are parallel to the gaps 6 and 6', respectively. Furthermore, the cut portions 12 and 12' are formed thereon, so that assuming that the flat chip 11 is placed into the cut portions 12 and 12', a distance between the top surface of flat chip 11 facing a recording tape 8 and the phantom tangent plane is selected within the range of 0.01 to 0.3 mm. Accordingly, in the assembled combined tape head of this embodiment, once the flat chip 11, as shown in FIG. 6(a), is adhered to the cut portions 12 and 12' by a suitable adhesive agent, the crucial requirements of the relation of the chip to both the tape and the gaps can be satisfied without any fine adjustment or the use of jigs.

In operation, the recording tape 8 travels in contact with the arcuate front surfaces of the recording head 2 and the playback head 3. The tape 8 is biased toward the flat chip 11 by means of a flexible pad 9 contained in cassette type or cartridge type tapes so as to face the chip 11 when the tape is inserted into the recording equipment. In this case, since the distance "d" shown in FIG. 5 is within the preferable range of 0.01 to 0.3 mm, the possibility that the recording tape 8 will skew or twist in a V-shaped groove defined by the arcuate front surfaces of the heads is almost completely eliminated. As a result, wrap angles suitable to the respective recording and playback heads can be obtained. Also, the possibility of displacement is eliminated since the chip is positively positioned in the notches.

FIG. 6(b) shows another example of a flat chip which is obtained by shaping one flat side wall of the flat chip 11 into an arcuate side wall 13 conforming to the arcuate front of the head surface. The chip 11' of FIG. 6 is employed in the second embodiment of the combined head as shown in FIG. 7, wherein a cut portion 12 which is adapted to receive a rectangular corner of the chip 11' formed only on an arcuate front surface of the head 2. Chip 11' when placed in cut 12 is adhered to the cut portion by an adhesive agent. In this embodiment, the arcuate side wall 13 is also adhered to the arcuate front surface of the playback head 3. While in the second embodiment, the cut portion 12 is formed only on the recording head 2, the cut portion 12 may be formed on the playback head 3 with an arcuate surface resting on head 2.

According to experiments performed by the inventor, the first and second embodiments exhibit almost the same functional and acoustic characteristics. However, the second embodiment is advantageous in that there is no need to form the cut portion, adapted to receive the rectangular corner of the chip, on each head in the combined head, and therefore it is more economical in terms of manufacturing cost.

In addition, a flat chip such as a flat chip 11, may be employed in place of the chip 11' in the embodiment of FIG. 7. In this case, the space between the arcuate front surface of the head having no cut portion and the flat side wall of chip is filled with an adhesive.

Although the above description pertains to a combined head where both the recording and playback heads are of the same size, generally, the playback head tends to be larger than the recording head and therefore each head has an inherent wrap angle preferable for carrying out its function. Accordingly, it is apparent that modifications of the combined tape head, which satisfy the above mentioned requirements as to an arrangement of the chip, are possible without departing from the essential scope of the present invention.

With the above described arrangement, it is possible to readily fix the chip at a desired position, whereby its workability is improved.

As is apparent from the above description, the combined recording/playback head according to the present invention has superior workability. Also, the present combined head is excellent for mass-production and the assembled combined head can provide a preferable wrap angle.

What is claimed is:

1. In a magnetic tape head having a recording head and a playback head combined into a unitary element with associated shield cases for each head, said heads having generally arcuate front surfaces having a groove therebetween and chip means positioned in said groove for controlling the wrap angle of a tape traveling over said tape head, the improvement comprising: slot means in at least one shield case for receiving one end of said chip means and for maintaining said chip means in position in said groove, wherein said chip means has a substantially flat top portion with said one end forming a rectangular corner with said top portion.

2. The tape head of claim 1 further comprising slot means in the other shield case for receiving the other end of said chip means and for maintaining said chip means in position in said groove.

3. The tape head of claim 1 wherein the other end of said chip has an arcuate surface of substantially the same radius as the arcuate front surface of the head upon which said chip means rests.

4. The tape head of claims 2 or 3 further comprising adhesive to secure said other end of said chip means to said other shield case.

5. The tape head of claims 1, 2 or 3 wherein said playback head is larger than said recording head.

6. The tape head of claim 1, 2 or 3 wherein said recording and playback heads each have a gap and the distance between the tangent line across said gaps to said flat top portion of said chip means is in the range of 0.01 to 0.3 mm.

7. The tape head of claim 1, 2 or 3 further comprising adhesive to secure said one end of said chip means into said slot means of said one shield case.

* * * * *